United States Patent [19]

Smith et al.

[11] Patent Number: 5,062,408
[45] Date of Patent: Nov. 5, 1991

[54] CHARBROILER

[75] Inventors: Mark Smith; Larry Cooper, both of Fuquay-Varina, N.C.

[73] Assignee: Middleby Corporation, Rosemont, Ill.

[21] Appl. No.: 511,044

[22] Filed: Apr. 19, 1990

[51] Int. Cl.$^5$ ............................................. F24C 3/08
[52] U.S. Cl. ........................... 126/41 R; 126/39 H; 126/39 J; 99/385; 99/401; 99/422
[58] Field of Search ................ 126/41 R, 41 C, 41 D, 126/39 H, 39 J, 332, 333, 337 R; 99/376, 377, 385, 401, 402, 422, 447

[56] References Cited

U.S. PATENT DOCUMENTS

| | | | |
|---|---|---|---|
| 2,898,846 | 8/1959 | Francia | 126/41 R X |
| 3,771,510 | 11/1973 | Short | 126/41 R |
| 4,508,097 | 4/1985 | Berg | 126/41 R |
| 4,715,356 | 12/1987 | Reynolds | 126/39 H |
| 4,886,044 | 12/1989 | Best | 126/41 R X |
| 4,899,724 | 12/1990 | Kuechler | 126/41 R |

Primary Examiner—Larry Jones
Attorney, Agent, or Firm—Laff, Whitesel, Conte & Saret

[57] ABSTRACT

A stainless steel sheet metal housing has three sets of supports which are vertically disposed, with respect to each other. One or more burners are mounted on the lower most support. A heat distribution member or members are mounted on the intermediate support. Grids or griddles are mounted on the upper most support. All of the burners, heat distribution members, grids and griddles may be lifted in or out of said housing whereby different combination of components may be provided. The heat distribution means may be either a plurality of ceramic briquettes or a radiant metal plate. This way, the charbroiler may be configured in many different ways to accommodate the changing tastes of customers, either in the short term over the course of a day or in the long term over a number of weeks, months or years.

11 Claims, 3 Drawing Sheets

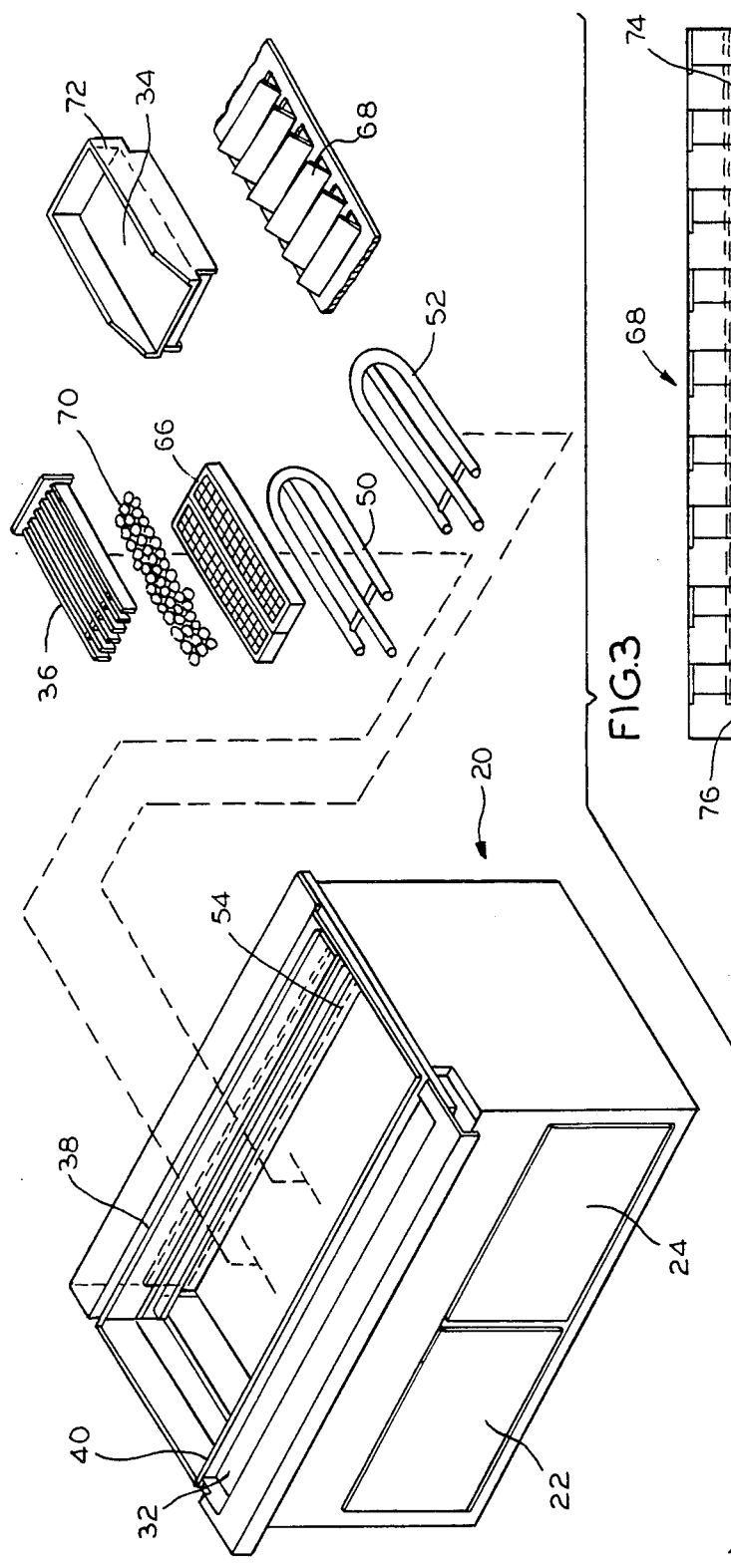
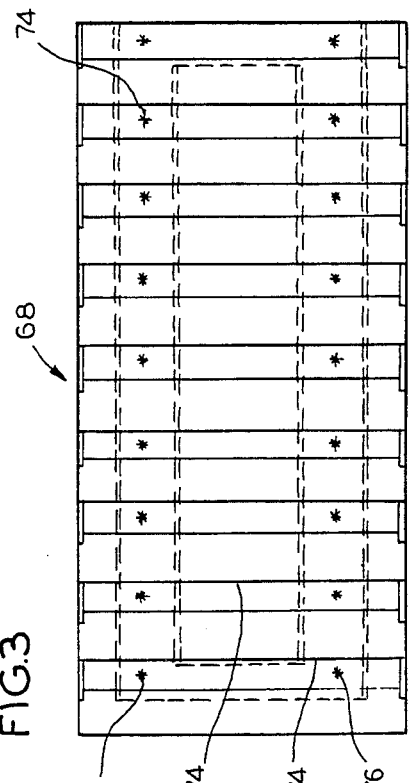
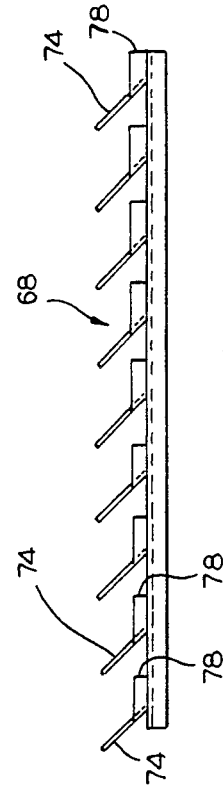
FIG.3
FIG.4
FIG.5

CHARBROILER

BACKGROUND OF THE INVENTION

This invention relates to restaurant class cooking equipment and more particularly to charbroilers which are especially—but not exclusively—well adapted for smaller restaurants.

The restaurants which may use this invention are, roughly speaking, represented by fast food restaurants, small cafes, diners and the like. In general, these types of restaurants feature either grid or griddle cooking. In a grid type of cooking, there are a number of spaced rods which directly support a food product (steak, patty, wiener, etc.) while it is cooking. The heat causes grease to drip out of the food, fall on a hot surface, burn and issue up smoke which affects the taste of the food. The spaced rods leave burn marks on the food to provide a cosmetic effect. The griddle type of cooking is a flat sheet of metal which is more like a frying pan that fries a product without either the smoke taste or the cosmetic effect of the burn marks.

When the restaurant is large or is part of a fast food chain, for example, management decides upon a type of cooking which it wishes to use and buys the proper and dedicated cooking equipment to implement that decision.

However, if the restaurant is a relatively small "mom and pop" type of business, it is not always advantageous to buy dedicated equipment. The customer's taste may change during the day, for example, they may want griddle fried eggs in the morning and charbroiled patties and steak at night. Or, the customers taste may change over time as they shift between griddle fried and charbroiled foods as, for example, when news events report the latest theories on cholesterol or the causes of stomach cancer.

Another consideration relates to avoiding hot and cold spots by spreading heat more evenly, which give a more predictable quality control over the food product. One approach to heat spreading is to interpose a ceramic material between a flame and a cooking surface. A commonly used ceramic is a layer of small pillow shaped briquettes about the size and shape of charcoal briquettes. The other approach (radiant cooking) is to provide a sheet of metal positioned between the flame and the food product in order to spread the heat more evenly. Different restauranteurs have different opinions on these two systems, preferring one over the other. Therefore, a desirable design would give the restauranteur an option of ordering either a ceramic or radiant style of charbroiling equipment, and then retrofitting it t become the other style in order to accommodate changing tastes.

Yet another consideration is the different and changing demands which may be placed upon a restaurant by customer's fickleness. One night, perhaps the ratio of orders for griddle and grid cooking may be opposite the ratio on the next night. This problem might be more severe for restaurants along a busy highway which is frequented at different times by people from many different parts of the country.

Regardless of how cooking equipment is designed, it must still meet the requirements of appropriate regulatory agencies, one of which is the American Gas Association (AGA). Therefore, options are limited. It becomes quite difficult to provide a single charbroiler with a high level of flexibility which meets all of the conflicting needs, rules, and regulations.

Accordingly, in view of all of these and other considerations, an object of the invention is to provide a charbroiler which offers a maximum degree of flexibility, with the least cost and labor requirements for switching over from one style of cooking to another. Here, an object is to enable a change over from grid to griddle and back again with almost no work. In this connection an object is enable a maximum freedom in selecting almost any of many different configurations of cooking surfaces in order to cater to almost an orders that customers may present.

Another object of the invention is to enable an in-the-field retrofit of a charbroiler in order to switch it between ceramic and radiant configurations.

SUMMARY OF THE INVENTION

In keeping with an aspect of the invention, these and other objects are accomplished by providing a surface support system which enables grids and griddles to be interchanged at will and in different ratios. In one embodiment, the geometry of the parts is that two grids and one griddle occupy exactly the same space on the support system. In other embodiments, there may be other proportions; however, there should be an even multiple of widths so that the entire cooking surface may be covered by either grids or grills or combinations thereof. The space between the burners and the surface unit is arranged to enable a quick change over between parts used for ceramic and radiant cooking.

BRIEF DESCRIPTION OF THE DRAWINGS

A preferred embodiment of the invention is seen in the attached drawings, wherein:

FIG. 3 is an exploded view of the inventive oven;

FIGS. 4 and 5 are a side elevation and a top plan view, respectively, of a radiant assembly used in the oven.

DESCRIPTION OF THE PREFERRED EMBODIMENTS

The inventive charbroiler 20 (FIG. 1) includes a stainless steel cabinet having a pair of doors, 22, 24, providing access for any suitable purposes such as storage, servicing equipment, or the like. The cabinet is coupled at 26 to a gas main, the flow of gas to burners being controlled by valves at 28, 30. A grease tray 32 is positioned near the griddle 34 in order to catch drippings therefrom. This tray 32 is slightly more than 3-inches wide in order to accept the end of a standard spatula for cleaning purposes.

Figure 1:
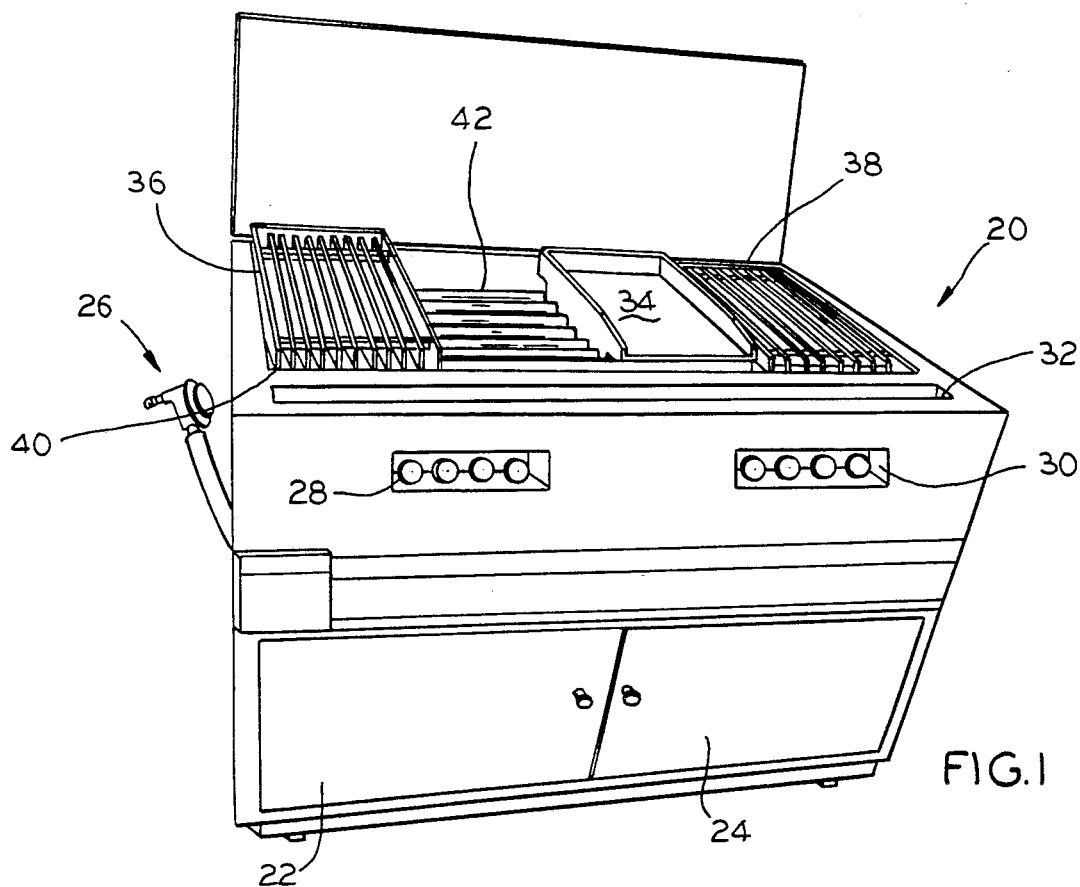
FIG. 1 is a perspective view of a charbroiler, incorporating the invention, in a radiant configuration.

The top of the charbroiler 20 includes front and back spaced parallel rails 38, 40 (FIGS. 1, 2, 3), for supporting griddle 34 or grids 36. Since the grids and griddles merely sit upon the rails 38, 40, they may be installed, removed, or interchanged merely by lifting them on or off. In one case, the geometry is such that two grids exactly fits the space occupied by one griddle. However, any suitable ratio of sizes may be used provided that the widths are a whole multiple so that the grids and griddles may be interchanged to exactly fit the space at the top of the charbroiler. In the example of FIG. 1, a radiant plate 42 rests upon intermediate level spaced parallel front and back rails 62, 64 at a level which is well below that of the grid 36 and griddle plate 34 in order to distribute the heat more uniformly.

The grid 36 or griddle 34, or any suitable combination thereof, are simply placed on the front and back rails 38, 40. Therefore, in the morning, the entire upper cooking surface area of the charbroiler may be covered by griddle plates 34. Perhaps at 10-11 AM, some people may begin to requesting charbroiled hamburgers while other customers are still ordering fried eggs. Therefore, maybe half of the griddle plates may be replaced by grids. Perhaps at the noon rush everyone wants charbroiled hamburgers, in which case, the entire surface area may be covered by grids.

Figure 2:
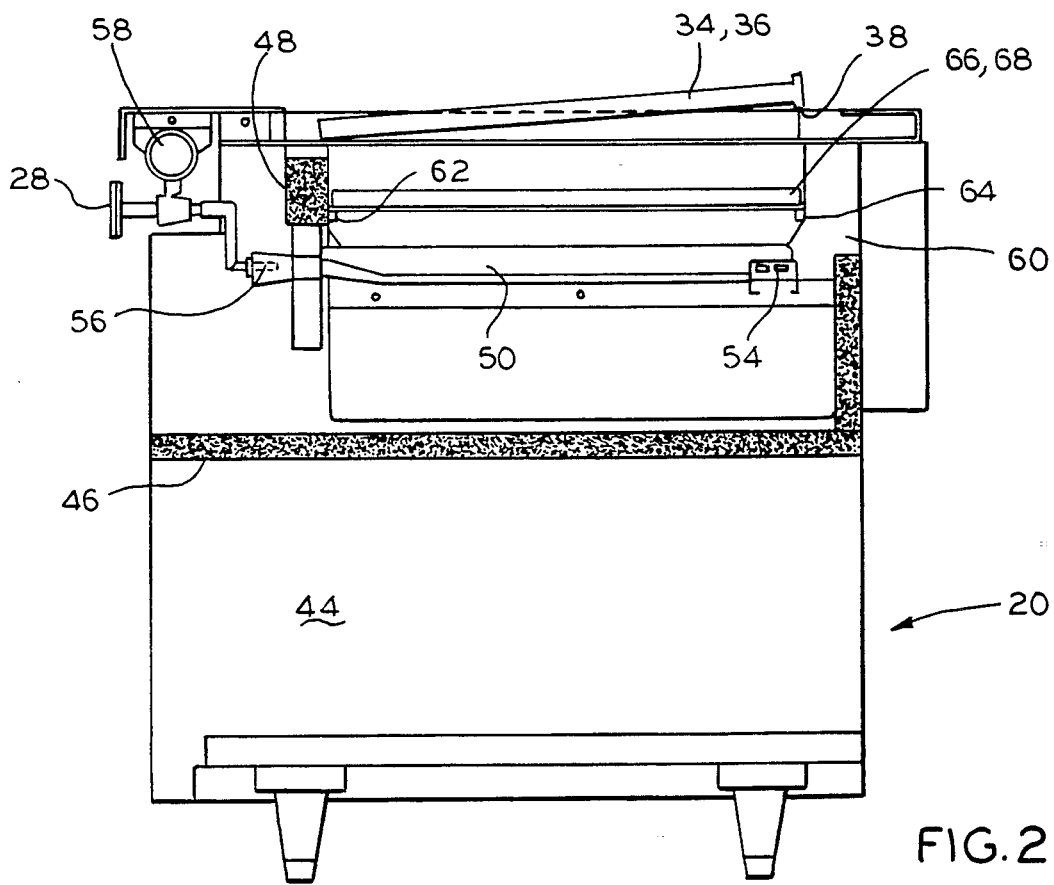
FIG. 2 is a cross section of the charbroiler shown in FIG. 1.

The cross section of the oven is seen in FIG. 2 as including a storage compartment 44 which is accessed via the doors 22, 24 of FIG. 1. Within the housing and above the storage compartment is a suitable insulation 46, 48, for containing the heat within the upper part of the cabinet where the burners are located and where the cooking occurs.

In FIGS. 2, 3, burners 50, 52 are supported in the front by gas fitting nipples 56 (FIG. 2) and are supported in the back by members which hook into supports 54 at the back of the cabinet. The nipples are parts of a pipe system for conveying gas from a manifold 58 to the burners 50. No orifice (nipple) change is required.

Intermediate level spaced parallel front and back rails 62, 64 support either a ceramic briquette grate 66 (FIG. 3) or a radiant plate 42, which may be interchanged by lifting them in or out of the cabinet. The ceramic material is a standard commercial item which is purchased, for example, from Ferro, Sebring, Ohio (Briquette #638). These are small pillow shaped pieces of ceramic which have the general configuration of a charcoal briquette. Their function is to provide thermal inertia, to spread the heat uniformly under the cooking surface, and to become hot enough to burn grease dripping on them in order to give a smoky taste.

A spatter shield (not shown here) may be provided for the cook to use as he sees fit. The spatter shield rests on the cabinet sides and back rail 38. However, it may also be used in connection with grids, if desired.

FIG. 4 is a side elevation and FIG. 5 is a top plan view of a radiant plate 42. This plate 42 may be used interchangeably with grate 66 and ceramic 70; the two would not be used simultaneously. In general, the radiant plate 42 is in the size and shape of two grates 66. The top surface of the radiant plate 68 is approximately a louver formed by a series of plates 74, each bent at an angle of approximately 45°. Each in the series of plates 74 is spot welded at the points indicated by asterisks (as at 76, for example) in FIG. 5. In addition, a somewhat box-like stiffening part 78 is provided o each plate 74 to contain drippings that are incinerated, turned to ash, by the burner heat in order to produce smoke.

This louver arrangement directs streams of warm air toward the product on the grid or griddles, with a substantially uniform distribution of heat in a desired pattern over the entire cooking surface. The upper surface of the radiant plate 42 becomes hot enough to burn grease dripping on it, thereby giving a smoky taste to food resting on a grid 36.

More particularly, the louvers may open either toward the front or the back of the griddle depending upon how the user elects to install them. The cooking surface will tend to be hotter on the side toward which the louvers direct the hot air, as compared to the temperature on the side away from the directed air. The chef using the charbroiler will have his own preferences for how the heat is distributed across the cooking surface and therefore will install the radiant plate 42 in order to aim the stream of hot air, as he chooses.

In general, it is through that most people will aim the hot air toward the back of the cooking surface. This way the chef will reach over and otherwise be personally exposed to the cooler cooking area. Usually, he will lay out hamburger patties, for example, on the hotter back of the cooking surface to sear the meat for locking in the juices. Then, he will flip the hamburger forward to the cooler cooking surface for a complete cooking. The hotter and cooler cooking surface areas also aid the chef in filling a customer's request for a rare or well done product.

Figure 8:
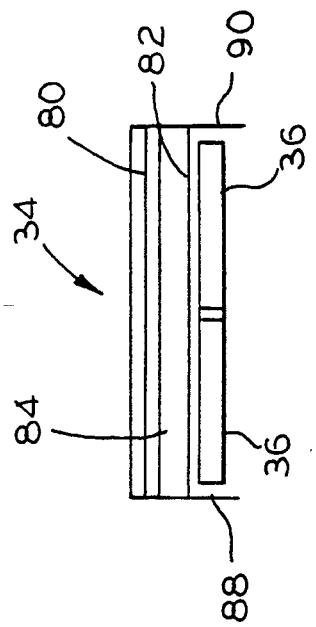
FIGS. 6-8 are three (top plan, side elevation, and front elevation) views of a griddle assembly taken along lines 7—7 and 8—8 respectively of FIG. 6.
Figure 6:
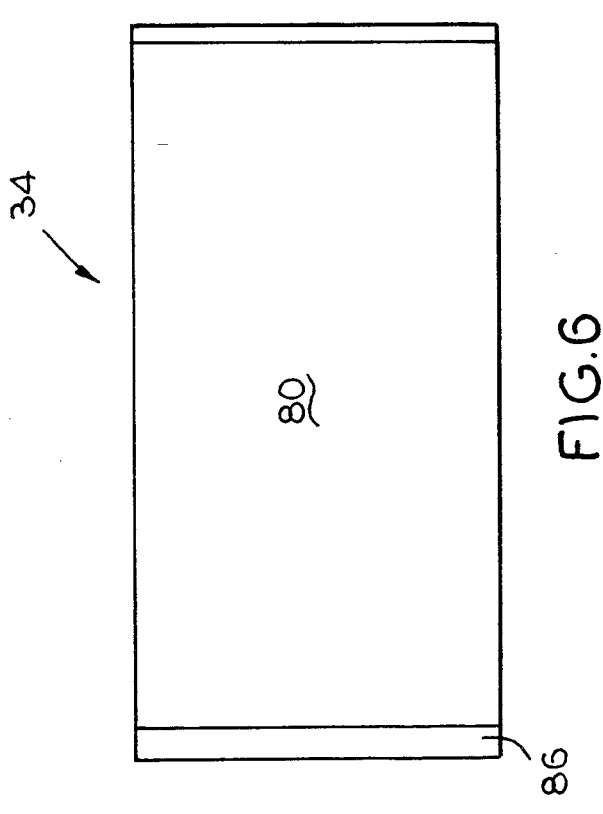
Figure 7:
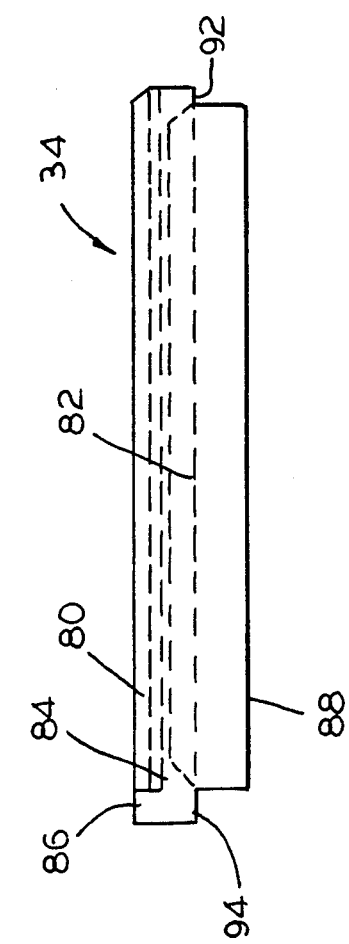

FIGS. 6–8 show the griddle assembly 34 which may be used in either of two modes in place of or on top of the grids 66. The cooking surface is a sheet of metal 80 which may be in the order of a quarter of an inch thick for example, to provide thermal inertia. Welded under the plate 80 is a heat baffle in the form of a sheet of metal, which defines an open heat accumulation space 84 under cooking surfaces 80. The rear part of the open space 84 terminates in a chimney 86 (FIG. 7) which provides entrance and exit as the hot air expands and contracts while it heats and cools.

Side plates 88, 90 (FIG. 8) depend from the edges of the griddle assembly. These side plates enable the griddle to fit over two grids 36, 36 so that the griddle may be installed without removing the grids. If the grids are removed, front and back notches 92, 94 of the griddle fit over the front and back rails 38, 40. Either way, the side plates 88, 90 collect a blanket of hot air beneath the baffle plate 82.

The advantages of the invention are (1) a flexible system which can switch almost instantly between smoky and non-smoky taste, grid cooking and griddle cooking, and (2) an easy retrofitting of cooking between ceramic and radiant cooking. Thus, the charbroiler is designed for the relatively small and independent restaurant which needs a single piece of equipment with great flexibility.

Those who are skilled in the art will readily perceive how to modify the invention. Therefore, the appended claims are to be construed to cover all equivalent structures which fall within the true scope and spirit of the invention.

The claimed invention is:

1. A charbroiler for cooking food comprising a cabinet including:
- an upper cooking level and;
- an intermediate heat distribution level;
- a plurality of grids for providing a cooking surface, for mounting on said upper cooking level; each grid having a width which is the same or a uniform multiple of at least one other grid;
- a plurality of griddles for providing a cooking surface, for mounting on said upper cooking level, each griddle having a width which is the same as or a uniform multiple of at least one other griddle and grid;
- whereby a cooking surface may be formed by an assembly of any suitable and desired combination of griddles and grids;

a first pair of spaced parallel support means at said upper cooking level for supporting either a plurality of grills, a plurality of griddles or a combination of griddles and grills on said upper cooking level;

a second pair of spaced parallel support means at said intermediate heat distribution level for supporting a selected one of said heat distribution means in the form of a plurality of ceramic briquettes and a sheet metal radiant heat distribution plate;

whereby either said ceramic briquettes or said sheet metal radiant heat distribution plate is positioned on the intermediate level supports and a plurality of grids, a plurality of griddles or a plurality of grids and griddles can be positioned on the upper level cooking supports;

said grids being positioned to drip grease drippings onto said heat distribution means to impart a smoky taste to the food being cooked.

2. The charbroiler of claim 1 wherein said heat distribution means is a ceramic material in the form of plurality of briquettes spread over a grate mounted on said intermediate level supports.

3. The charbroiler of claim 1 wherein said heat distribution means is a metal plate substantially filling a horizontal cross section of said cabinet and having a plurality of louvers for guiding and directing hot air toward said cooking surface, each of said louvers having ends with box-like parts which form bent up ends that catch and incinerate drippings falling on said metal plates, said metal plate being mounted on said intermediate support for achieving cooking with a radiated heat.

4. The charbroiler of claim 1 wherein said heat distribution means is an interchangeable grate for supporting said ceramic material or metal plate having a plurality of louvers for guiding and directing hot air toward said cooking surface, said grid or said metal plate being mounted on said intermediate support and substantially filling a horizontal cross section of said cabinet.

5. The charbroiler of claim 1 and a griddle further comprising a cooking surface separated from an underlying baffle plate by a heat accumulation space, and a pair of dependant side plates for accumulating a heated blanket of air under said baffle plate.

6. The charbroiler of claim 1 wherein said pair of dependant plates fit over and receive two of said grids, whereby it is not necessary to remove said two grids in order to install said griddle on said charbroiler.

7. The charbroiler of claim 1 wherein said radiant heat distribution plate is a louvered metal sheet resting on said second pair of support means, each of said louvers having ends with an upstanding box-like part to catch and incinerate drippings.

8. The charbroiler of claim 7 and means whereby said louvers may be directed toward either a front or back of said cooking surface.

9. A griddle assembly for use on the charbroiler claim 1, said assembly comprising a relatively thick sheet of metal forming a cooking surface, a baffle plate suspended below said sheet of metal to define a heat accumulating area, a chimney at the back of said heat accumulating area to enable air to exit or enter as it heats and cools, and a pair of dependent side plates for accumulating a blanket of hot air under said baffle plate.

10. The assembly of claim 9 wherein said pair of side plates are spearated by a space which exactly fits over two of said grids.

11. A griddle assembly comprising a relatively thick sheet of metal forming a cooking surface, a baffle plate suspended below said thick sheet of metal to define a heat accumulating area, a chimney at the back of said heat accumulating area of enable air to exit or enter as it heats and cools, and a pair of dependent side plates for accumulating a blanket of hot air under said baffle plate.

* * * * *